Oct. 17, 1933.  A HERZ  1,931,224
VISIBLE DATE SCHEDULING APPLIANCE
Filed Aug. 26, 1927
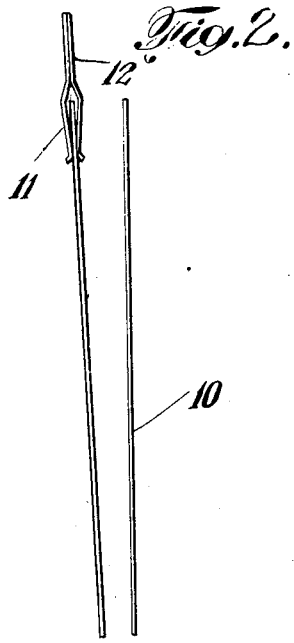
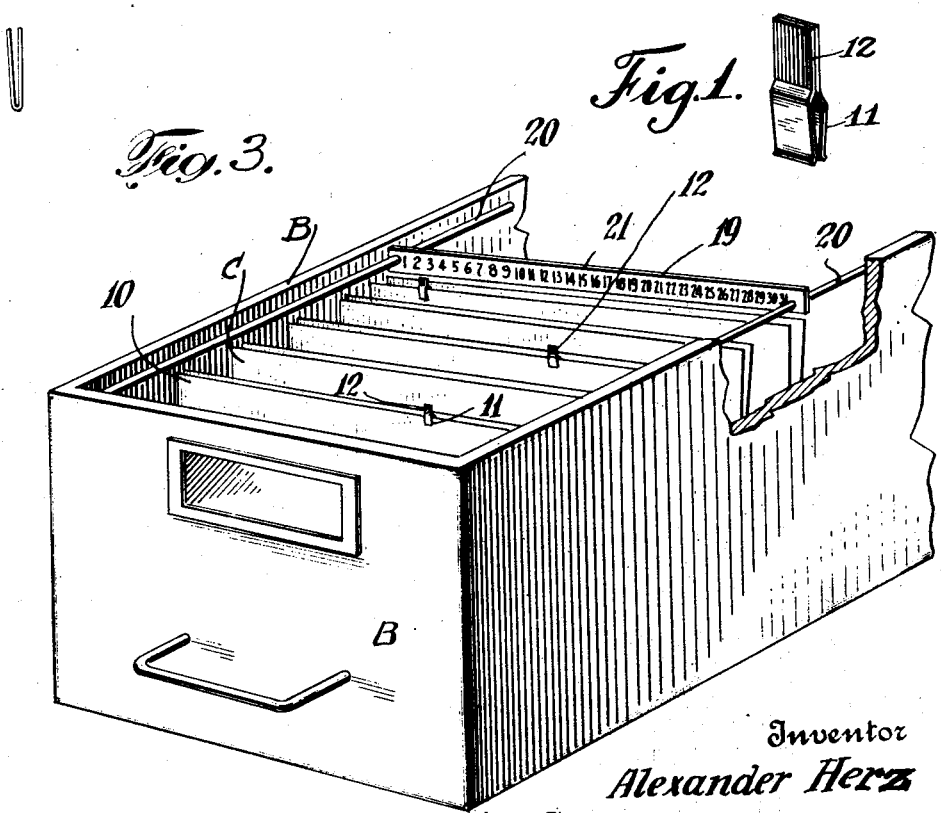
Inventor
Alexander Herz
By his Attorneys Patented Oct. 17, 1933

1,931,224

UNITED STATES PATENT OFFICE 1,931,224

VISIBLE DATE SCHEDULING APPLIANCE

Alexander Herz, New Rochelle, N. Y.

Application August 26, 1927. Serial No. 215,544

5 Claims. (Cl. 129—16.5)

This invention relates to a visible date scheduling or date affixer and finder appliance for use in business filing systems, wherein compiled business data under a filing classification may be checked without the removing of the data from its place of deposit at determined intervals, preferably corresponding to the number of days of each month period, whereby that data requiring attention at a particular period within a month or year will be ascertainable at a glance on that period or on an advanced date. In that manner a person shall be relieved of constantly inspecting the data to ascertain the time it will demand action or relying upon the memory for so doing, and thus avoid possibility of inattention thereto beyond the time period fixed or set for such action prescribed thereto.

With this aim in view follow-ups, notices and other related service can be accomplished with dispatch as well as with accuracy and certainty. In connection with the filing of papers such as correspondence, notices, sales memoranda or other like data, etc. incident to the handling of businesses, the checking of the same becomes negligible as the data, so to speak, is buried from observation. To bring the subject matter foremost for attention at or near a given time and maintain a service with any degree of accuracy it is required to individually inspect the records so often within prescribed periods that the cost for operating and maintenance of the filing system becomes excessive and at the same time there exists the factor of uncertainty in following up and notification being issued after the required periods through a calendar year or other computed time.

The present invention contemplates eliminating the aforesaid contingencies prevalent in the filing systems now in use with the result that filed data will be grouped and identified at sight for attention or action at a prescribed period or a particular day of a month within the year. In carrying out the invention there are series or groups of clips forming tabs arranged in a set, those of each series or group being tinted or otherwise finished to distinguish them from any of the other groups, the clips in each group by color or finish being indicative of a month period of the year so that the set preferably includes 12 series or groups differently colored or finished from each other, and the clips of the entire series or groups will identify the respective months of a calendar year.

Upon the filing cabinet or other depository for containing the business data is a scale set with numerals consecutively arranged corresponding to the number of days of a month, the scale being located to cooperate with selected clips when attached to a file, jacket or other container for data within the cabinet, to visually mark and signify a determined date for action to be taken with respect to such data in a given space in said cabinet without requiring individual inspection of such data or the removal thereof from the space. The clips are placed relative to the data by the use of a gauge element applicable to the exposed edge of the file, jacket or other container for the data, whereby the applied clips constituting markers will coincide or align with selective numerals upon the scale for definitely affixing a visual indication of the period of time for action to be had respecting the data, and in this manner automatic dating of contents within the cabinet or other depository will be effected over a definite period of time.

The invention further aims to generally improve filing devices, their systems and mode of operation and particularly to produce one which can be operated with a minimum of effort on the part of a user and in which the possibility of involuntary error is eliminated to a maximum degree.

The invention will be fully described hereinafter, reference being had to the accompanying drawing in which:

Figure 1 is a detailed perspective view of one of the clip members of the appliance.

Figure 2 is a fragmentary end view of a folder for data showing a clip attached thereto to present a tab therefor.

Figure 3 is a perspective view fragmentarily of a drawer section of a cabinet showing the date scale and its mounting, the drawer section being partly broken away at one side thereof.

Similar reference characters indicate corresponding parts throughout the several views in the drawing.

Referring to the drawing in detail, for the purposes of illustrating the preferable construction, application and manner of use of the data-affixing and finder appliance, there has been shown in Figure 3 of the drawing, a drawer B adapted for use in a conventional filling cabinet of the usual construction. As is customary in the use of each drawer B there is arranged within the same a plurality of followers or dividers C, each being of the ordinary form to separate the drawer interiorly thereof into independent spaces for accommodating data or retaining mediums therefor, such as a temporary file or folder 10 into which is introduced compiled data for reception within the file cabinet and accessible at all times to the user thereof. The cabinet (not shown) its drawers B, followers or dividers C and the files or folders 10 form no part of the present invention except as intermediaries in carrying out the purpose and operation thereof. Therefore, these parts may be varied or changed according to the customs in business filing systems.

The date-affixing and finder appliance comprises preferably a series or groups of clips forming time-period markers, an example of one of the same being indicated at 11 and the marker clips of the respective groups or series are colored or finished in part or wholly distinctively from each other so that the clips in any one group can be visually distinguished from the clips of another group. For example, the clips 11 in one group may be finished or surfaced black and the same being symbolical of the month of January. The clips of the next group may be colored orange indicative of the month February; the next group of clips may be colored green indicative of the month March; the clips of the next group may be surfaced or finished white indicative of the month April; the clips of the next group may be colored maroon and indicative of the month May; the clips of the next group may be colored pale blue and indicative of the month June; the clips of the next group may be colored blue and white and indicative of the month July; the clips of the next group may be colored red and indicative of the month August; the clips of the next group may be colored dark blue and indicative of the month September; the clips of the next group may be colored pink and indicative of the month October; the clips of the next group may be colored brown and indicative of the month November, and the clips of the final group may be colored yellow and indicative of the month December of the calendar year. Of course it is optional in the changing of the colorings or surfacing of these groups, as varying combinations of colors or other finishes may be carried forth, yet it is essential that the clips 11 of the respective groups be distinguished from the clips of other groups and that their distinguishing characteristics serve as identifications of the different months of a calender year, whereby observation had of the clip in any one group will mentally convey to a person a particular month of the year.

Each clip is of a size and shape to provide a visible extension tab 12. These clips 11 with the extension tabs 12 are designed for detachable engagement on the upper edge of either the followers or dividers C or the files or folders 10 massing the data within the drawer B, with the extension tabs 12 projecting a distance above to expose the characteristics of same for observation to identify a particular date in a manner presently described.

The clips 11 having the extension tabs 12 may be of any number, and may be used to designate respective groups or series of data according to the volume of compiled data to be retained within the spaces for their storage within the drawer B of the cabinet, so that each group of data may carry extension tabs 12 of a particular kind for the visual identification of the mouth to which it pertains. Each drawer carries a date scale, the same being calibrated numerically from 1 to 31 with the numerals displayed thereby corresponding to the days of the month period of a calendar year, these numbers being spaced at the required distance apart so that the scale will extend substantially the width of the drawer, whereby the extension tabs 12 of the clips 11 when engaged with the followers or dividers C or files or folders 10 will register selectively with the numerals 14 upon said scale, thus signifying a particular month date by the finish or color characteristic of the clip and the day date within said month by the numeral registering or coinciding with the location of the clip 11 and its extension tab 12. The tabs 12 when carried upon the followers or dividers C or files or folders 10 cooperate with the scale to indicate a particular day date and a month designation, thereby visually signalling that the data confined within the tabbed space requires attention or action under the finder date created by the appliance.

A gauge bar, the same having date indicia corresponding to the scale and this gauge is manually handled so that a person can apply the same to the upper exposed edge of the followers or dividers C or files or folders 10 for the accurate locating of the clips 11 thereon for affixing a visible date through the cooperation of the tab extension 12 with the scale 13 in a manner as hereinbefore set forth. The gauge bar is not essential for the scale itself may be used in the positioning of the tabs as will be obvious.

In Figure 3 of the drawing there is shown the date scale, wherein there is employed a bar 19, the same being slideably engaged upon track rods 20, these being located within the drawer B, spaced from and parallel with the side walls thereof. The bar 19 has the date indicia 21 thereon. It will be apparent that the bar 19 can be manually shifted fore and aft of the drawer B with the result that the tabs 12 will register selectively with the date indicia upon the bar 19 for the functioning of the bar 19 in a manner hereinbefore set forth.

In the use of the clips 11 in conjunction with the indicia 21 on bar 19 it will be obvious that folders corresponding to predetermined desired dates will be indicated, each of which folders will contain the data requiring attention at the predetermined date indicated by the position and color of its clip 11, thus minimizing involuntary errors of past due action related to the compiled data.

It will be appreciated that the invention is not confined to the specific constructions and variations described but that many modifications and alterations may be made therein without departing from the invention. For example, the location of the date scale may be altered and the manner in which it is placed in the cabinet may be changed within wide limits. The invention is not restricted to a means to date files in a cabinet, but can be extended to be used as an "evidence or sentinel system" for the keeping of stock records, and other items. The invention can also be utilized on any vertical card index, and similar devices and is in general capable of wide application.

What is claimed is:

1. An appliance of the kind described comprising a drawer, a plurality of record members in said drawer, each record member extending transversely of said drawer, marker elements on said record members, the position of each marker element on its record member being indicative of a certain date within a period, said marker elements being marked to indicate determined periods, track rods within said drawer spaced from and disposed along the side walls thereof, and a suitably marked date scale slidably engaging said track rods and shiftable fore and aft of said drawer, said date scale when brought adjacent any marker element showing the date represented by the position of said marker element on its record member and thereby the date within the period for which the marker element itself has been marked.

2. An appliance of the kind described comprising a drawer, a plurality of file members in said drawer, each file member arranged transversely of said drawer, marker elements on said file members, the position of each marker element on its file member being indicative of a certain date within a period, said marker elements being marked to indicate determined periods, a suitably marked date scale slidably mounted on said drawer and shiftable fore and aft of said drawer so that it may be positioned opposite and along the upper edge of any selected file member, said scale marked to show the date indicated by the position of any marker element on its file member.

3. An appliance of the kind described comprising a drawer, a plurality of file members massed side by side in said drawer, distinctively marked marker elements on said file members, the distinctive markings indicating predetermined periods, the position of each marker element on its file member indicating a division of a period, a scale slidably mounted within said drawer and shiftable relative to said marker elements so as to be brought into close proximity to any selected marker element to show its position on its file member and thereby the division of the period represented by the distinctive marking of the marker element itself.

4. An appliance of the kind described comprising a drawer, a plurality of file members massed side by side in said drawer, distinctively marked marker elements on said file members, each marker element positioned on its file member and distinctively marked so that one will indicate a period and the other a division of a period, a scale slidably mounted on said drawer above said file members and shiftable along the depth of said mass so that it may be positioned opposite and along the upper edge of any selected file member, said scale marked to show the information indicated by the position of any marker element on its file member.

5. An appliance of the kind described comprising a holder for file members, a plurality of file members massed side by side and held by said holder, distinctively marked marker elements on said file members, each marker element selectively positioned on its file member and distinctively marked, a movably mounted scale positioned adjacent the exposed edges of said file members and shiftable along the depth of said mass so that it may be positioned opposite and along the exposed edge of any selected file member, said scale marked to show the information indicated by the selected position of any marker element on its file member.

ALEXANDER HERZ.